United States Patent

Schoenwitz

[15] 3,697,953

[45] Oct. 10, 1972

[54] SYSTEM FOR MONITORING ABNORMAL SYSTEM OPERATIONS IN A SYSTEM HAVING A CENTRAL STATION AND A PLURALITY OF REMOTE STATIONS

[72] Inventor: Frank H. W. Schoenwitz, Schaumburg, Ill.

[73] Assignee: Honeywell Inc., Minneapolis, Minn.

[22] Filed: Dec. 28, 1970

[21] Appl. No.: 101,563

[52] U.S. Cl. ..........................340/163 R, 340/147 R

[51] Int. Cl. ..........................................H04q 9/00

[58] Field of Search..................................340/163

[56] References Cited

UNITED STATES PATENTS 3,408,626 10/1968 Gabrielson ................340/163

3,413,606 11/1968 Chicanowicz .............340/163

3,444,521 5/1969 Breese .......................340/163

*Primary Examiner*—Harold I. Pitts

*Attorney*—Lamont B. Koontz and Clyde C. Blinn

[57] ABSTRACT

A system for alarming abnormal operations in a system having a central station and a plurality of remote stations connected by a transmission channel wherein operation of remote equipment is accomplished by sending messages to and from the central station. A logic circuit means is connected to receive outputs of system variables which are used in a prearranged manner to provide an alarm output when the reported condition status doesn't agree with the command intent. To minimize alarm annunciations not all abnormal system conditions will be alarmed, provided the reported status agrees with the command intent. The variables are; the type of commands sent from the central station, how much time has elapsed since the command has been sent, whether the command had actuated equipment at the remote station, whether the operating condition at the remote station had changed status as a result of a change in the equipment, and the present status of the operating condition at the remote station.

5 Claims, 8 Drawing Figures

Figure 1:
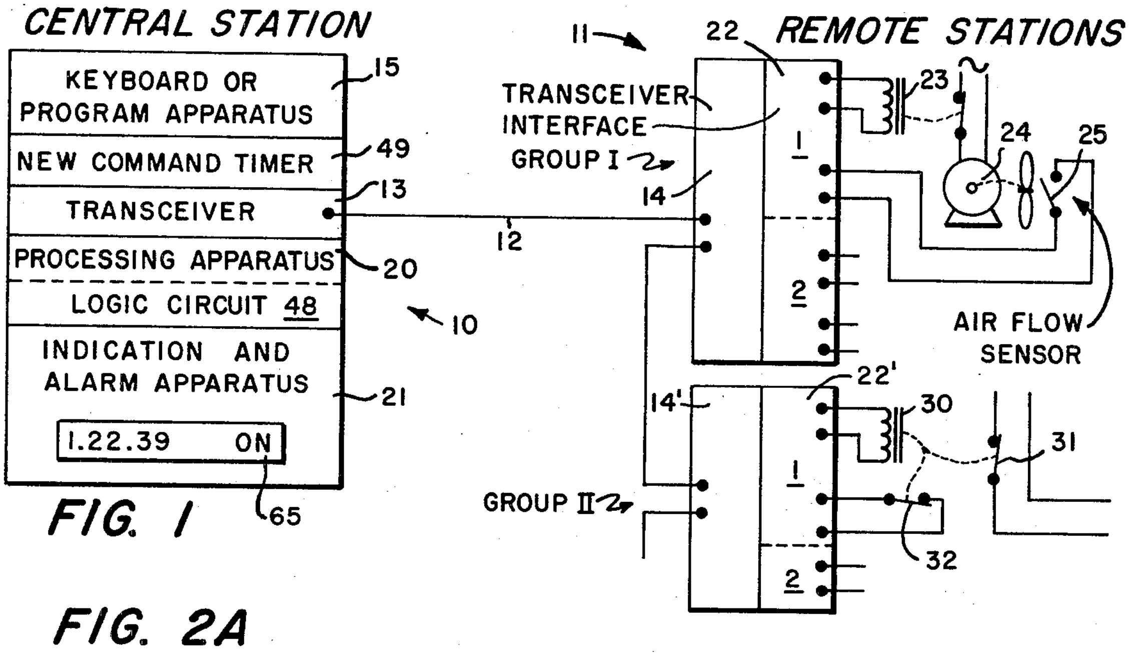

INVENTOR.
FRANK H. W. SCHOENWITZ
BY Clyde C. Blinn
ATTORNEY

INVENTOR.
FRANK H. W. SCHOENWITZ
BY Clyde C. Blinn
ATTORNEY.

INVENTOR.
FRANK H. W. SCHOENWITZ
BY Clyde C. Blinn
ATTORNEY.

INVENTOR.
FRANK H. W. SCHOENWITZ
BY Clyde C. Blinn
ATTORNEY.

FIG. 4

| | CONTACT STATUS 0 = OPEN 1 = CLOSED | CHANGE OF STATUS 0 = NO CHANGE 1 = CHANGE | LOCKOUT 0 = NOT STARTED 1 = STARTED | NEW COMMAND 0 = OLD 1 = NEW ✳ | TYPE OF NEW COMMAND 0 = STOP 1 = START ✳ | ALARM NEW | ALARM OLD | STATUS |
|---|---|---|---|---|---|---|---|---|
| | 0 | 0 | 0 | 0 | 0 | | | OFF |
| | 0 | 0 | 0 | 1 | 0 | | | OFF |
| | 0 | 0 | 0 | 1 | 1 | ABN OFF | | |
| # 1'→ | 0 | 0 | 1 | 0 | 0 | | ABN OFF | |
| | 0 | 0 | 1 | 1 | 0 | | | OFF |
| # 1→ | 0 | 0 | 1 | 1 | 1 | ABN OFF | | |
| | 0 | 1 | 0 | 0 | 0 | | | OFF |
| | 0 | 1 | 0 | 1 | 0 | | | OFF |
| | 0 | 1 | 0 | 1 | 1 | ABN OFF | | |
| | 0 | 1 | 1 | 0 | 0 | ABN OFF | | |
| | 0 | 1 | 1 | 1 | 0 | | | OFF |
| | 0 | 1 | 1 | 1 | 1 | ABN OFF | | |
| # 2'→ | 1 | 0 | 0 | 0 | 0 | | ABN ON | |
| # 2→ | 1 | 0 | 0 | 1 | 0 | ABN ON | | |
| | 1 | 0 | 0 | 1 | 1 | | | ON |
| # 3→ | 1 | 0 | 1 | 0 | 0 | | | ON |
| | 1 | 0 | 1 | 1 | 0 | ABN ON | | |
| | 1 | 0 | 1 | 1 | 1 | | | ON |
| | 1 | 1 | 0 | 0 | 0 | ABN ON | | |
| | 1 | 1 | 0 | 1 | 0 | ABN ON | | |
| | 1 | 1 | 0 | 1 | 1 | | | ON |
| | 1 | 1 | 1 | 0 | 0 | | | ON |
| | 1 | 1 | 1 | 1 | 0 | ABN ON | | |
| | 1 | 1 | 1 | 1 | 1 | | | ON |

NOTES:

ABN OFF = ABNORMALLY OFF
ABN ON = ABNORMALLY ON

✳ RETURN TO ZERO AFTER FIRST SUBSEQUENT SCAN

INVENTOR.
FRANK H. W. SCHOENWITZ
BY
ATTORNEY.

SYSTEM FOR MONITORING ABNORMAL SYSTEM OPERATIONS IN A SYSTEM HAVING A CENTRAL STATION AND A PLURALITY OF REMOTE STATIONS

SUMMARY OF THE INVENTION

In the present invention, signals indicative of a number of operating variables are connected to a logic means to determine the status of a condition operation taking place. When the command message is sent from the central station, the type of command and how long it has been since the command was sent is used by the logic means with three other variables obtained from reporting messages from a remote station. The messages report the affect upon the remote equipment as a result of the command message, any change in the status of the condition brought about by the remote equipment and the present status of the operating condition. When these five variables are acted upon by the logic means, the present status and conditions not agreeing with command intent are detected.

Figure 2A:
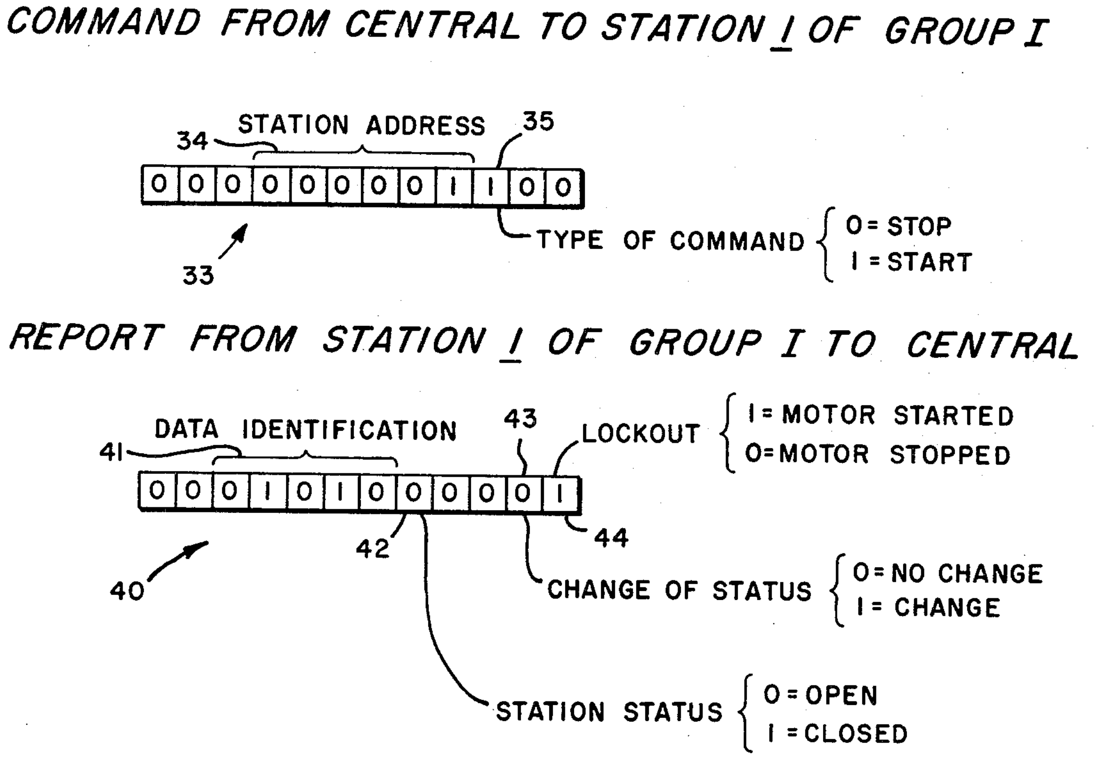
Figure 2B:
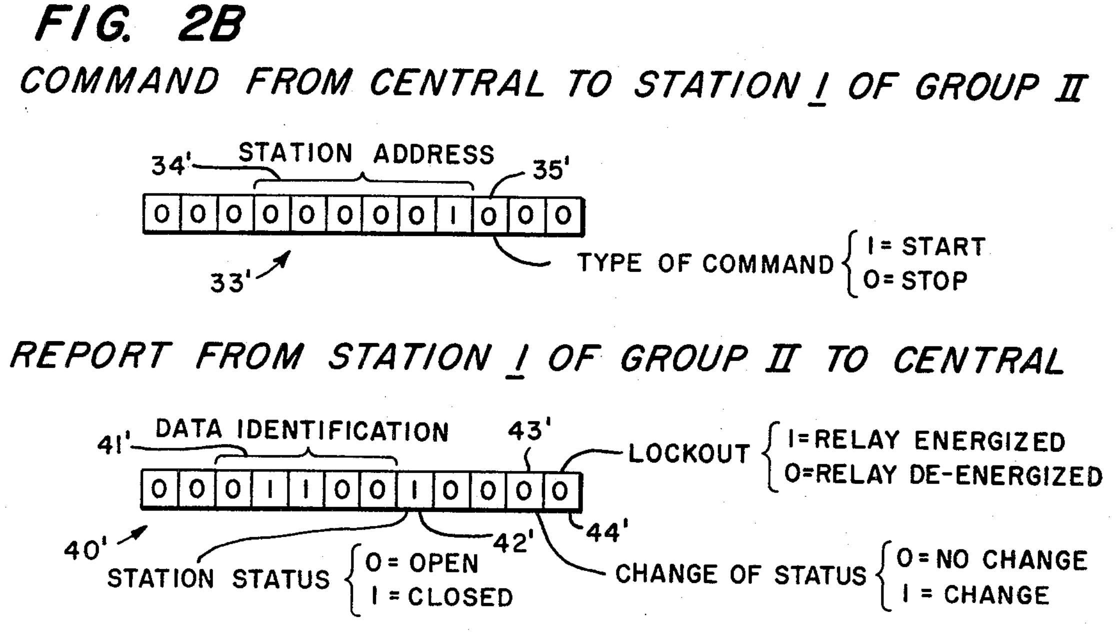
Figure 2C:
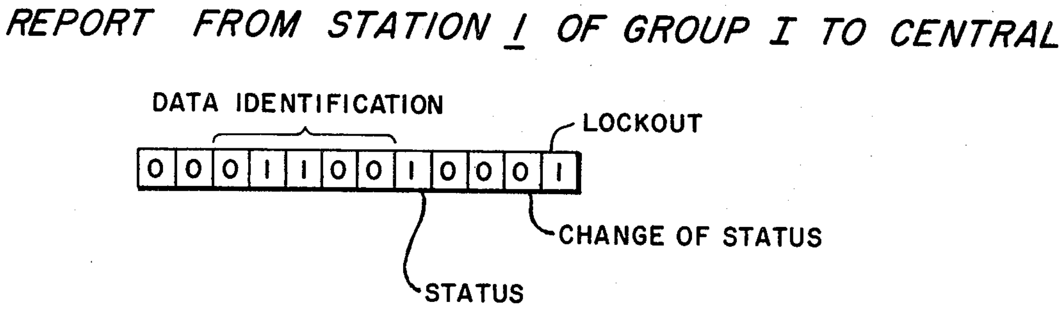
Figures 3, 3A:
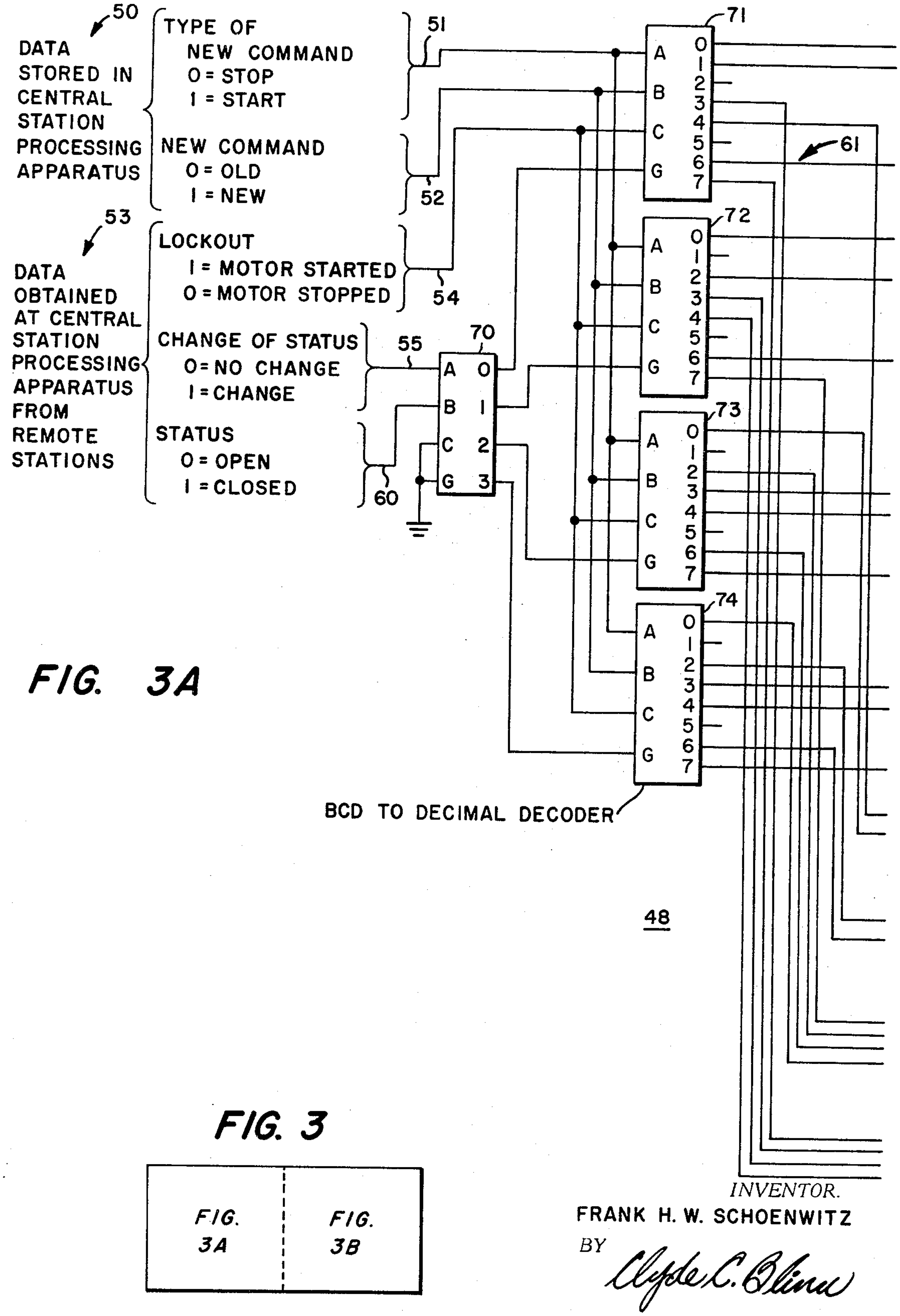

The present invention is disclosed in the drawing of which:

FIG. 1 is a schematic representation of the system having a central station and the remote stations, FIGS. 2A, 2B and 2C are typical command and reporting messages sent from and to the central station, FIG. 3 comprised of FIGS. 3A and B are a schematic showing of the logic circuit to which the five operating variables of the system are given to determine abnormal operations, and FIG. 4 is a table representing the manner in which the logic circuit means alarms abnormal operations.

DESCRIPTION OF THE INVENTION

Referring to FIG. 1, a central station is connected to a plurality of groups of remote stations 11 over a transmission channel 12 for accomplishing the control and supervision of system operating conditions associated with the remote stations. The central station has a transceiver 13 for sending and receiving messages from and to the central station over the transmission channel. Similar transceivers 14 are associated with the remote stations. The particular type of messages sent between the central and remote stations are no part of the present invention; however, one particular type of system is disclosed in the James R. Berrett et al. application, Ser. No. 864,679, now abandoned, filed Oct. 8, 1969 in which messages comprising a plurality of bits in binary form are sent from and to the central station to supervise and control the operating conditions associated with the remote stations.

The central station has a keyboard or program apparatus 15 for accomplishing system operations by sending command messages to the remote stations and having certain information reported to the central station. A processing apparatus 20 selectively processes the messages and the present status and certain abnormal operations are indicated or alarmed on the indication and alarm apparatus 21.

Each of the remote stations in the groups of remote stations has certain interface appartatus 22 which is associated with transceiver 14 for accomplishing the operations of command messages and for returning certain information by means of a message back to the central station. The particular manner in which the messages are handled by the interface apparatus 22 is no part of the present invention; however, in the mentioned Berrett et al application as well as co-pending Roger J.Feulner et al. application, Ser. No. 814,702, filed Apr. 9, 1969, now U.S. Pat. No. 3,618,082 the manner in which a command message actuates certain equipment and returning of certain information concerning the status of operating conditions back to the central station are disclosed.

Figure 3B:
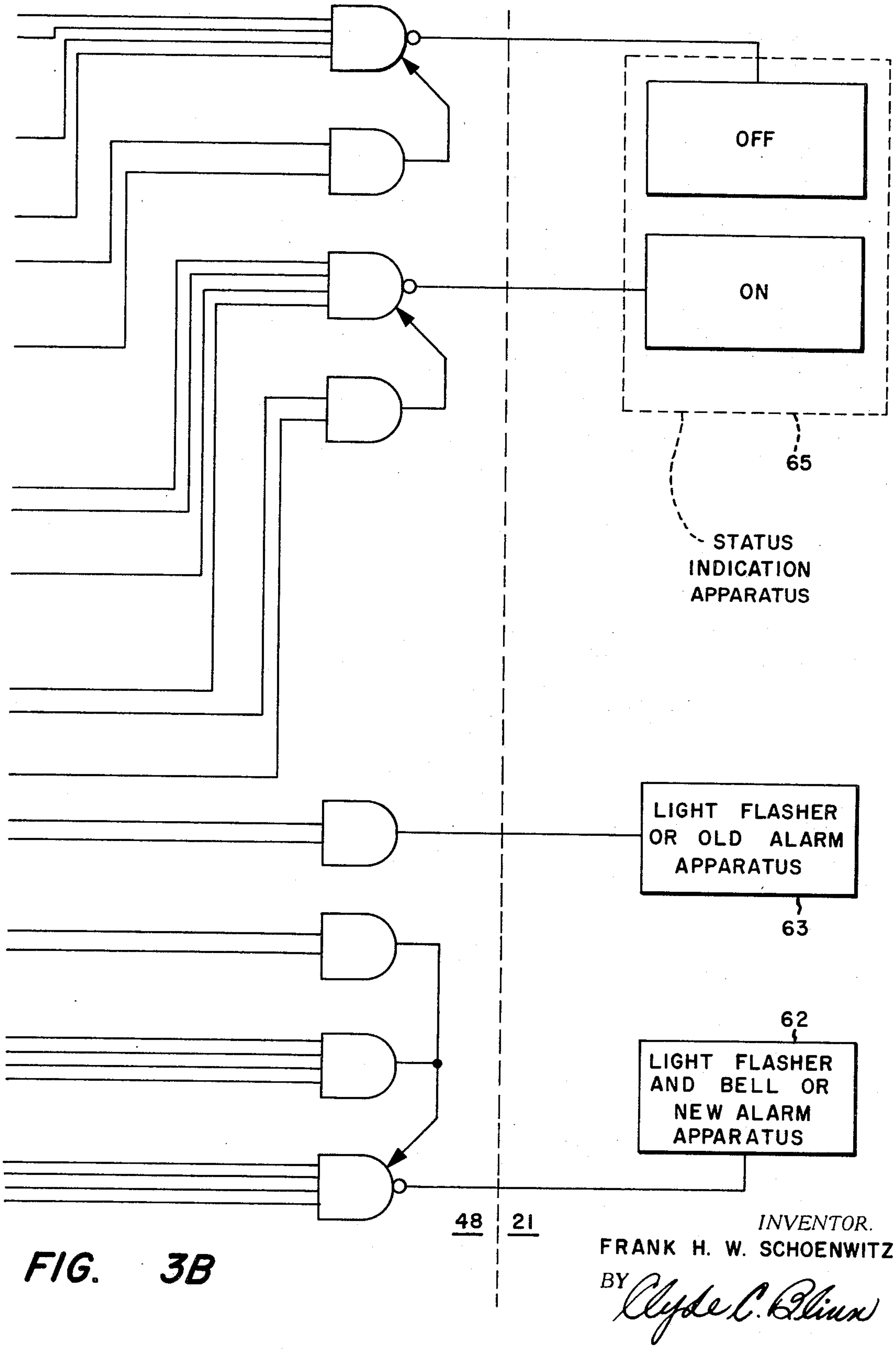

While the particular manner in which command messages are sent from the central station to bring about a particular operation and messages are sent from the central station to have remote station report certain data is no part of the present invention, the processing of the command messages and report messages by processing apparatus 20 is of specific concern. Processing apparatus 20 has a logic circuit 48, as shown in FIGS. 3A and 3B which receives information originating from the central station and being received by the central station from the remote stations providing an output to be indicated or alarmed on apparatus 21. For example, as a command message is sent to initiate a particular operation at a remote station and the operation is accomplished in accordance with the command message the output of the logic circuit indicates the command intent has been accomplished. Another example is a request for the status of a particular point at a remote station and upon the remote station reporting to the central station the processing apparatus processes the reporting message and the output of the logic circuit provides an indication of the status whether on or off of the particular reported point. In the operation as heretofore described, each time a message is sent from the central station or received by the central station from a remote station, the messages are processed by processing apparatus 20. The various information obtained from the messages provides an output from the logic circuit 48 to provide an indication or alarm depending upon the particular condition at apparatus 21. The specific operation of the indication and alarm apparatus upon receiving an output from the logic circuit of FIG. 3 will be explained in more detail.

While the invention is applicable to various types of remote system operations, two particular systems are disclosed associated with stations of each of the groups I and II for explanation purposes. Station 1 of group I has a relay 23 for energizing a fan motor 24 which upon operating causes air to close an air flow sensor or switch 25 also connected to station 1. Station 1 of group II has a relay 30 for closing an electrical circuit 31. A switch 32 actuated by the relay provides a signal indicative of the operation of the relay 30.

Referring to FIG. 2A, a typical command message and a reporting message for the operation of the equipment associated with group I of station 1 in FIG. 1 is shown. The command message 33, which is made up of 12 bits in binary form, has 6 bits at 34 for the station address and a single bit 35 to indicate the type of command, either "0" for stop or "1" for start. When the command message is sent over the transmission channel 12, the transceiver and interface equipment of group I receives the message to cause the energization of relay 23 if bit 35 is "1" as a start command.

Reporting message 40 in FIG. 2A of a subsequent reporting operation, has 12 bits in binary form with: 5 bits 41 to indicate the data identification; bit 42 to indicate the status or position of switch 25, that is 0 = open and 1 = closed; a change of status bit 43 to indicate a change in the status or position of switch 25, 0 = no change and 1 = change; and a lockout bit 44 to indicate whether the equipment or relay such as 23 or 30 is energized. When the command message is received at the remote station with a start command, the remote equipment in interface 22 operates to energize relay 23. A circuit is closed in interface 22 to provide the lockout signal in the reporting message so that upon the remote equipment of the interface 22 operating as a result of a command signal, a "1" appears in bit 44 of the reporting message. Upon the operation of fan motor 24 of station 1 in FIG. 1, air flow sensor switch 25 closes to result in a change of status of the operating condition controlled by station 1 so that the interface apparatus 22 provides for a "1" in bit 43 and a "1" in bit 42 to indicate a "change of status" and the present "status" as closed.

A similar type of operation occurs on the command message being sent from the central station to station 1 of group II. The command message 33', as shown in FIG. 2B, has the station address at 34' and the type of command bit 35'. Similarly the reporting message 40' has a data identification at 41', a status bit 42' a change of status bit 43' and a lockout bit 44'. In the case of station 1 in group II, the operating condition is the closure of switch 32 which is indicated by the "change of status" bit 43 and the "status" bit 42'. The lockout signal of bit 44' is accomplished by the interface apparatus 22' when relay 30 is energized.

Each time a command message is sent from the central station either by a keyboard operation or by a program apparatus at 15, a new command timer 49 is operated. A predetermined time period is allowed to have all of the operations take place as a result of a command message. The setting of the new command timer provides a "new command" output which is used by a logic means in processing appratus 20 to determine whether abnormal operations in the system have taken place. At the same time, the "type of new command" output is used by the logic means. The type of new command is determined by the command selection at apparatus 15 (1 for a start command and 0 for a stop command).

Specifically, the reported information of the first reporting message received at the central station, after predetermined time period has elapsed (as set by timer 49) is used with the information of "type of command" and the fact that it is "a new command" to provide five inputs to logic circuit 48. After the first message is processed, the "new command" and "type of command" inputs to logic circuit become zero.

Referring to FIG. 3, schematic showing of the logic circuit 48 has the five inputs. Two of the inputs at 50 are initiated at the central station and received through processing apparatus 20 from timer 49 and program apparatus 15. These inputs are the "type of new command" 51 and whether the command is a "new command" 52. The remaining three inputs at 53 are obtained from processing apparatus 20 upon receiving messages from the remote stations. These are the "lockout" signal 54, the "change of status" signal 55 and the "status" signal 60. Depending upon these five inputs, the input to logic circuit 48 which is made up of a plurality of binary coded decimal (BCD) to decimal decoders provides an output at one of the plurality of output circuits 61. Output circuits at 61 are connected to a new alarm apparatus 62 (a flashing light and a bell associated with indication apparatus 21 in FIG. 1) to an old alarm apparatus 63 (a flashing light associated with indication apparatus 21 in FIG. 1) and/or a status indication apparatus 65 (a display associated with indication apparatus 21 in FIG. 1).

The operation of the logic circuit is shown by the table in FIG. 4 which discloses the five inputs to the logic circuit and the type of alarm and/or status which is indicated.

OPERATION OF THE INVENTION

Assuming that a command message is sent from the central station to station 1 group I of the remote stations to start the fan motor 24. The command message, as shown in FIG. 2A, has the command bit 35 "1" for start. Upon receiving the message at transceiver 14 in the system of FIG. 1, interface apparatus 22 is actuated to energize relay 23. The fan motor 24 is started and shortly thereafter switch 25 closes in response to air flow.

At the time the command message is sent, new command timer 49 is set for a specific time such as 10 seconds. Subsequently, the reporting messages such as message 40 of FIG. 2A are received from the remote stations. After the 10 seconds time has elapsed giving time for normal delays in the operation of equipment the next reporting message 40 is processed by processing apparatus and the command operation is analyzed by the logic circuit to determine whether any abnormal operations are present. After message 40 is processed the first time, subsequent messages 40 are processed using only the three variables from the reporting message as the type of command and new command return to "0".

In the particular case of the command message of FIG. 2A, the variables which are fed into the circuits associated with 50 and 53 are available; that is, the "-type of new command" is "1" from bit 35 of the command message, the "new command" is "1" since the command was just sent, the "lockout" is "1" as the equipment associated with the interface apparatus 22 has been set to energize relay 23, the "change of status" did not occur as the bit is "0" and the "status" is open as the status bit 42 is "0". Such an example is shown as No. 1 in the table in FIG. 4 and by means of the logic circuit of FIG. 3, the new alarm apparatus 62 is energized to provide a bell and flashing light alarm at the central station.

With inputs at 50 and 53 of 00111 of inputs 60, 55, 54, 52 and 51, the binary coded decimal (BCD) to decimal decoders 70, 71, 72, 73 and 74 provide an output at terminal 7 of decoder 71 to energize new alarm apparatus 62. Decoder 70 using inputs at 55 and 60, provides the energization of the ground (G) for one of the decoders 71, 72, 73 or 74 (in this case decoder 71) and the inputs 51, 52 and 54 to decoders 71, 72, 73 and 74 (in this case decoder 71 which has a ground connection).

After processing apparatus 20 places the five variables into the logic circuit shown in FIG. 3 to provide the alarm indication, the type of command and new command signals return to "0". Any subsequent consideration of the variables by the logic circuit makes use of "0" for the "type of new command" and a "0" for the "new command". At any subsequent reporting of such variables of station 1 with inputs to the logic circuit of FIG. 3, old alarm apparatus 63 is energized as shown in example No. 1' of FIG. 4.

A similar type of operation would exist for station 1 of group II making use of a command message as shown in FIG. 2B and the reporting message 40'. The similar five operating variables being applied to the logic circuit of FIG. 3 as inputs 10010 results in an energization of the new alarm apparatus 62 as shown in the table in FIG. 4 as example No. 2. Since type of new command a command returns to "0", any further consideration of the various parameters as input 10000 results in the energization of the old alarm apparatus as shown in example No. 2' in FIG. 4.

For a reporting example not having a command, a similar operation takes place except that the new command is "0" and type of command is "0". Assume that station 1 of group I reported by a message as shown in FIG. 2C with lockout as "1", change of status as "0" and "status" as "1", the inputs to the logic circuit of FIG. 3 would be as example No. 3 of FIG. 4. Output circuit 4 of decoder 73 is energized to present an "on" indication at apparatus 65.

The embodiments of the invention in which an exclusive property or right is claimed are defined as follows:

1. In a system for indicating system operations, comprising:
   a central station comprising,
   first message transceiver apparatus for sending and receiving messages, and
   processing apparatus connected to said transceiver for processing messages received by said central station comprising
   logic circuit means having a plurality of input circuits and a plurality of output circuits,
   indication apparatus, and
   means connecting said input circuits to said processing apparatus and said output circuits to said indication apparatus,
   at least one remote station connected to said central station comprising:
   second message transceiver apparatus for sending and receiving messages,
   control means adapted to energize condition changing means,
   change of status responsive means adapted to respond to a change in the condition being changed,
   status responsive means adapted to respond to a status of the condition being changed, and
   means connecting said control means, said change of status responsive means and said status responsive means to said second message apparatus to provide a reporting message reporting a state of operation of said control means, a status of said condition and a change in the status of said condition,
   whereby upon said processing apparatus receiving said reporting message a first signal indicative of said state of operation of said control means, a second signal indicative of said status and a third signal indicative of said change in status is fed into said input circuits of said logic means to indicate at said indication apparatus the operational status of said remote station.

2. The invention of claim 1 wherein:
   said reporting message comprises a plurality of bits in binary form,
   one of said bits being indicative of said state of operation of said control means,
   another of said bits being indicative of said status of said condition, and
   a third of said bits being indicative of said change in the status of said condition.

3. The invention of claim 1 wherein said central station comprises,
   program apparatus for initiating operational command messages to be sent to said remote stations by said first message transceiver apparatus, and
   means connecting said program apparatus to said input circuits of said logic circuit means for providing to said logic circuit means a fourth signal indicative of the type of command and a fifth signal indicative of whether the command is a new command.

4. The invention of claim 3 comprising timer apparatus connected to said program apparatus wherein said logic circuit initially upon a new command being sent by said program apparatus makes use of said first, second, third, fourth and fifth input signals and upon said predetermined time period expiring said logic circuit makes use of only said first, second and third input signals received from said remote station through said message processing apparatus.

5. The invention of claim 4 wherein,
   said logic circuit comprising BCD to decimal decoder means for receiving said first, second, third, fourth and fifth signals in binary form,
   said indication apparatus comprising;
   on and off condition status indications,
   new alarm apparatus for indicating abnormal system operations reported by a first report made of a combination of input signals and
   old alarm apparatus for indicating abnormal system operations reported after said first report.

* * * * *